United States Patent
Lynn

(10) Patent No.: US 11,312,644 B1
(45) Date of Patent: Apr. 26, 2022

(54) TRANSPORTABLE OZONE SUPPLY UNIT WITH ONE OR MORE AUXILIARY COMPARTMENTS CONTAINING MIXING ASSEMBLIES FOR GENERATING AQUEOUS OZONE SOLUTION

(71) Applicant: Daniel W. Lynn, Omaha, NE (US)

(72) Inventor: Daniel W. Lynn, Omaha, NE (US)

( * ) Notice: Subject to any disclaimer, the term of this patent is extended or adjusted under 35 U.S.C. 154(b) by 0 days.

(21) Appl. No.: 17/505,000

(22) Filed: Oct. 19, 2021

Related U.S. Application Data

(63) Continuation-in-part of application No. 17/378,977, filed on Jul. 19, 2021, now Pat. No. 11,198,627, which is a continuation-in-part of application No. 17/325,966, filed on May 20, 2021, now Pat. No. 11,098,910, which is a continuation-in-part of application No. 17/200,799, filed on Mar. 13, 2021, now Pat. No. 11,045,571.

(51) Int. Cl.
| | | |
|---|---|---|
| *C02F 1/78* | (2006.01) |
| *B01F 23/23* | (2022.01) |
| *B01F 23/232* | (2022.01) |
| *B01F 23/237* | (2022.01) |

(52) U.S. Cl.
CPC ............... *C02F 1/78* (2013.01); *B01F 23/23* (2022.01); *B01F 23/232* (2022.01); *B01F 23/237613* (2022.01); *C02F 2201/782* (2013.01); *C02F 2209/04* (2013.01); *C02F 2303/04* (2013.01)

(58) Field of Classification Search
CPC ......... C01B 13/11; B01F 23/23; B01F 23/232
See application file for complete search history.

(56) References Cited

U.S. PATENT DOCUMENTS

| | | | |
|---|---|---|---|
| 5,853,014 A | * | 12/1998 | Rosenauer ............... B08B 9/00 134/102.1 |
| 6,153,105 A | | 11/2000 | Tadlock et al. |
| 6,334,328 B1 | | 1/2002 | Brill |
| 6,685,825 B1 | | 2/2004 | Chang |
| 8,071,526 B2 | | 12/2011 | Lynn |
| 8,075,705 B2 | | 12/2011 | Lynn |
| 9,068,149 B2 | | 6/2015 | Lynn |
| 9,151,528 B2 | | 10/2015 | Erbs et al. |
| 9,174,845 B2 | | 11/2015 | Lynn |

(Continued)

FOREIGN PATENT DOCUMENTS

| | | | | |
|---|---|---|---|---|
| ES | 1174333 U | * | 1/2017 | ............. C01B 13/11 |

*Primary Examiner* — Robert A Hopkins
(74) *Attorney, Agent, or Firm* — Nasr Patent Law LLC; Faisal K. Abou-Nasr

(57) ABSTRACT

A transportable system for generating aqueous ozone solution includes a hand truck carrying one or more auxiliary compartments containing respective mixing assemblies that are fluidically coupled to an ozone supply unit. At least one mixing assembly includes a first flow path for water to flow through and a second flow path in parallel with the first flow path. The first flow path includes one or more ozone intake ports that are fluidically coupled to one or more ozone output ports of the ozone supply unit. The second flow path includes a control valve that selectively permits a portion of the water to flow through the second flow path to produce a negative pressure in the first flow path so that ozone is drawn into the first flow path and mixed into the water flowing through the first flow path to produce an aqueous ozone solution.

18 Claims, 10 Drawing Sheets

(56) References Cited

U.S. PATENT DOCUMENTS

| | | |
|---|---|---|
| 9,522,348 B2 | 12/2016 | Lynn |
| 2002/0127158 A1 | 9/2002 | Holsclaw et al. |
| 2003/0209502 A1* | 11/2003 | Lacasse .................... C02F 9/00 210/760 |
| 2004/0004042 A1 | 1/2004 | Hadley et al. |
| 2004/0074252 A1 | 4/2004 | Shelton |
| 2004/0168989 A1 | 9/2004 | Tempest |
| 2009/0142225 A1 | 6/2009 | Tornqvist |
| 2009/0185959 A1 | 9/2009 | Weber et al. |
| 2010/0219137 A1 | 9/2010 | Lacasse |
| 2013/0193081 A1 | 8/2013 | Vasiliu et al. |
| 2013/0341285 A1 | 12/2013 | Marion |
| 2014/0027388 A1 | 1/2014 | Constant |
| 2014/0263097 A1 | 9/2014 | Lynn |
| 2016/0251243 A1 | 9/2016 | Lynn |

\* cited by examiner

TRANSPORTABLE OZONE SUPPLY UNIT WITH ONE OR MORE AUXILIARY COMPARTMENTS CONTAINING MIXING ASSEMBLIES FOR GENERATING AQUEOUS OZONE SOLUTION

CROSS-REFERENCE TO RELATED APPLICATIONS

The present application is a Continuation-in-Part of U.S. application Ser. No. 17/378,977 filed Jul. 19, 2021 and titled "OZONE SUPPLY UNIT WITH AUXILIARY COMPARTMENT CONTAINING CONTROLLED SUCTION MIXING ASSEMBLY FOR GENERATING AQUEOUS OZONE SOLUTION," which is a Continuation-in-Part of U.S. application Ser. No. 17/325,966 filed May 20, 2021 and titled "HVAC DECONTAMINATION SYSTEM WITH REGULATED OZONE OUTPUT BASED ON MONITORED OZONE LEVEL IN AMBIENT AIR," which is a Continuation-in-Part of U.S. application Ser. No. 17/200,799 filed Mar. 13, 2021 and titled "REDUCED NOISE AIR DECONTAMINATOR," all of which are incorporated herein by reference.

TECHNICAL FIELD

The present disclosure relates to systems for creating aqueous ozone solutions.

BACKGROUND

Water intended for potable use (e.g., drinking water), may contain disease-causing organisms, or pathogens, which can originate from the source of the water, from resistance to water treatment techniques, from improper or ineffectual water treatment techniques, or so forth. Pathogens include various types of bacteria, viruses, protozoan parasites, and other organisms. To protect drinking water from disease-causing organisms, or pathogens, water suppliers often add a disinfectant, such as chlorine, to the water. However, disinfection practices can be ineffectual because certain microbial pathogens, such as *Cryptosporidium*, are highly resistant to traditional disinfection practices. Also, disinfectants themselves can react with naturally-occurring materials in the water to form byproducts, such as trihalomethanes and haloacetic acids, which may pose health risks.

A major challenge for water suppliers is how to control and limit the risks from pathogens and disinfection byproducts. It is important to provide protection from pathogens while simultaneously minimizing health risks to the population from disinfection byproducts. Oxidation reduction potential (ORP) can be used for water system monitoring to reflect the antimicrobial potential of the water, without regard to the water quality, with the benefit of a single-value measure of the disinfection potential, showing the activity of the disinfectant rather than the applied dose.

There are a number of systems that generate ORP in water by injecting ozone into the water to create an ozone and water solution. However, high pressure water applications present challenges, often requiring the use of an intermediate tank that must be filled prior to use (much like a water heater). To overcome such challenges, there is a need for improvements in the mixing and distribution of water and ozone solution.

SUMMARY

Aspects of this disclosure are directed to a transportable system for generating aqueous ozone solution. In embodiments, the transportable system includes a hand truck carrying an ozone supply unit and an auxiliary compartment that contains a mixing assembly. The ozone supply unit includes an ozone supply unit enclosure coupled to the hand truck. The ozone supply unit enclosure may have one or more air intake ports and one or more ozone output ports. The ozone supply unit further includes a plurality of ozone generators disposed within the ozone supply unit enclosure. The ozone generators may be fluidically coupled to the one or more air intake ports and the one or more ozone output ports of the ozone supply unit enclosure. The auxiliary compartment is also coupled to the hand truck. In embodiments, the auxiliary compartment contains a mixing assembly that includes a first flow path and a second flow path in parallel with the first flow path. The first flow path allows water to flow therethrough and includes one or more ozone intake ports that are fluidically coupled to the one or more ozone output ports of the ozone supply unit enclosure. The second flow path includes a control valve that selectively permits a portion of the water to flow through the second flow path to produce a negative pressure in the first flow path so that ozone is drawn into the first flow path through the one or more ozone intake ports and mixed into the water flowing through the first flow path to produce an aqueous ozone solution.

In further embodiments, the transportable system may further include a secondary auxiliary compartment coupled to the hand truck and fluidically coupled to the one or more ozone output ports of the ozone supply unit enclosure. The secondary auxiliary compartment may include another (similarly or differently structured) mixing assembly for producing additional aqueous ozone solution. The transportable system may further include a plurality of stop valves for connecting respective mixing assemblies of one or more selected auxiliary compartments from the primary auxiliary compartment and the plurality of secondary auxiliary compartments to an output (e.g., to provide aqueous ozone solution at a selected flow rate, i.e., the flow rate associated with the primary mixing assembly, the secondary mixing assemblies, or both together). The stop valves can be further configured to connect the respective mixing assemblies of the primary and secondary auxiliary compartments in parallel with one another (e.g., to achieve higher flow rate by combining flows from the primary and secondary mixing assemblies together).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
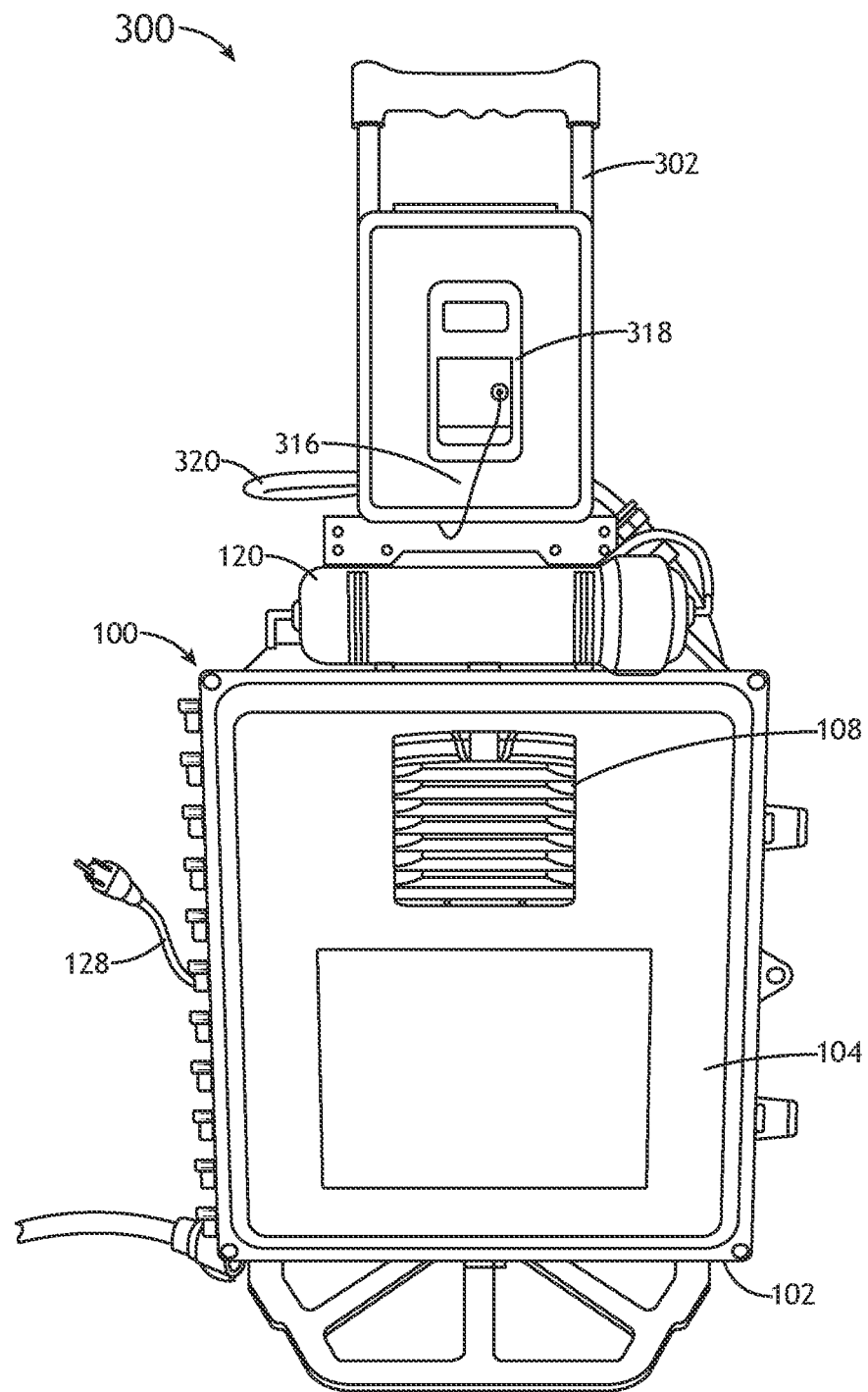
FIG. 1 is a perspective front view of a transportable system for generating aqueous ozone solution, in accordance with one or more embodiments of this disclosure.

Reference will now be made in detail to the subject matter disclosed, which is illustrated in the accompanying drawings.

Embodiments of this disclosure are directed to a transportable system that employs an ozone supply unit with an auxiliary compartment containing a controlled suction mixing assembly for generating aqueous ozone solution (e.g., a water and ozone solution). In residential or commercial applications, the system may be configured to supply the aqueous ozone solution to a spray gun, portable fill station, or other any other output application that receives water from a main water source (e.g., the main water line). The system may be employed as household or building water cleansing, disinfecting, and/or softening solution. The transportability of the system allows it to be used for any particular zone of a residential or commercial building. The transportable system can be used for cleansing and/or degreasing hard surfaces such as plastic, glass, ceramic, porcelain, stainless steel, or the like. The transportable system can also be used for cleansing and/or degreasing equipment such as food service equipment which may include, but are not limited to, ovens, ranges, fryers, grills, steam cookers, oven stacks, refrigerators, coolers, holding cabinets, cold food tables, worktables, ice machines, faucets, beverage dispensing equipment, beer dispensers, shelving food displays, dish washing equipment, and grease traps. The transportable system can also be used for cleansing and/or degreasing HVAC or plumbing systems such as roof top units, air scrubbers, humidifiers, water heaters, pumps, or the like.

An ORP value can be used for water system monitoring to reflect the antimicrobial potential of a given sample of water. ORP is measured in millivolts (mV), with typically no correction for solution temperature, where a positive voltage shows a solution attracting electrons (e.g., an oxidizing agent). For instance, chlorinated water will show a positive ORP value whereas sodium sulfite (a reducing agent) loses electrons and will show a negative ORP value. Similar to pH, ORP is not a measurement of concentration directly, but rather of activity level. In a solution of only one active component, ORP indicates concentration. The World Health Organization (WHO) adopted an ORP standard for drinking water disinfection of 650 millivolts. That is, the WHO stated that when the oxidation-reduction potential in a body of water measures 650 (about ⅔ of a volt), the sanitizer in the water is active enough to destroy harmful organisms almost instantaneously. For example, *E. coli, Salmonella, Listeria*, and Staph pathogens have survival times of under 30 seconds when the ORP is above 650 mV, compared against >300 seconds when it is below 485 mV.

An example ORP sensor uses a small platinum surface to accumulate charge without reacting chemically. That charge is measured relative to the solution, so the solution "ground" voltage comes from the reference junction. For example, an ORP probe can be considered a millivolt meter, measuring the voltage across a circuit formed by a reference electrode constructed of silver wire (in effect, the negative pole of the circuit), and a measuring electrode constructed of a platinum band (the positive pole), with the water in-between.

Increasingly, microbial issues are commanding the attention of water treatment operators, regulators, media, and consumers. There are many treatment options to eliminate pathogenic microbes from drinking water. One such option includes ozone ($O_3$), an oxidizing agent approved for drinking water treatment by the U.S. Environmental Protection Agency. For instance, ozone is one of the strongest disinfectants approved for potable water treatment capable of inactivating bacteria, viruses, *Giardia*, and *Cryptosporidium*.

In some embodiments, the disclosed system may be configured to output water having an ORP of about 600 mV to about 1000 mV at approximately 1 to 10 gallons per minute (GPM), with particular embodiments being configured to output water having an ORP of about 700 mV to about 900 mV to provide pathogenic control at a flow rate of approximately 3 to 5 GPM. Additionally, the system may be configured to reduce the surface tension of the water being used to cleanse and/or degrease hard surfaces and equipment by creating a water and ozone solution wherein the surface tension of the water is reduced from about 72 Millinewtons per meter at 20 degrees Centigrade to about 48-58 Millinewtons per meter at 20 degrees Centigrade to greatly improve the cleansing and/or degreasing qualities thereof.

In embodiments, the transportable system employs one or more mixing assemblies for in-line mixing of water and ozone to generate an aqueous ozone solution. Furthermore, each mixing assembly may be disposed within a respective auxiliary compartment, such that the water and aqueous ozone solution flow paths are isolated from internal components of an ozone supply unit. Through the use of a mixing assembly that is structurally isolated from the internal components of the ozone supply unit, the system is able to handle high pressure water flow through the mixing assembly without fear of a leak causing damage to electronic components associated with the ozone supply unit (e.g., ozone generators, controllers, relays, etc.). Having the mixing assembly separately contained within an auxiliary compartment can also provide more space for internal components of the ozone supply unit to produce a system with improved throughput and a reduced footprint overall.

Figure 2:
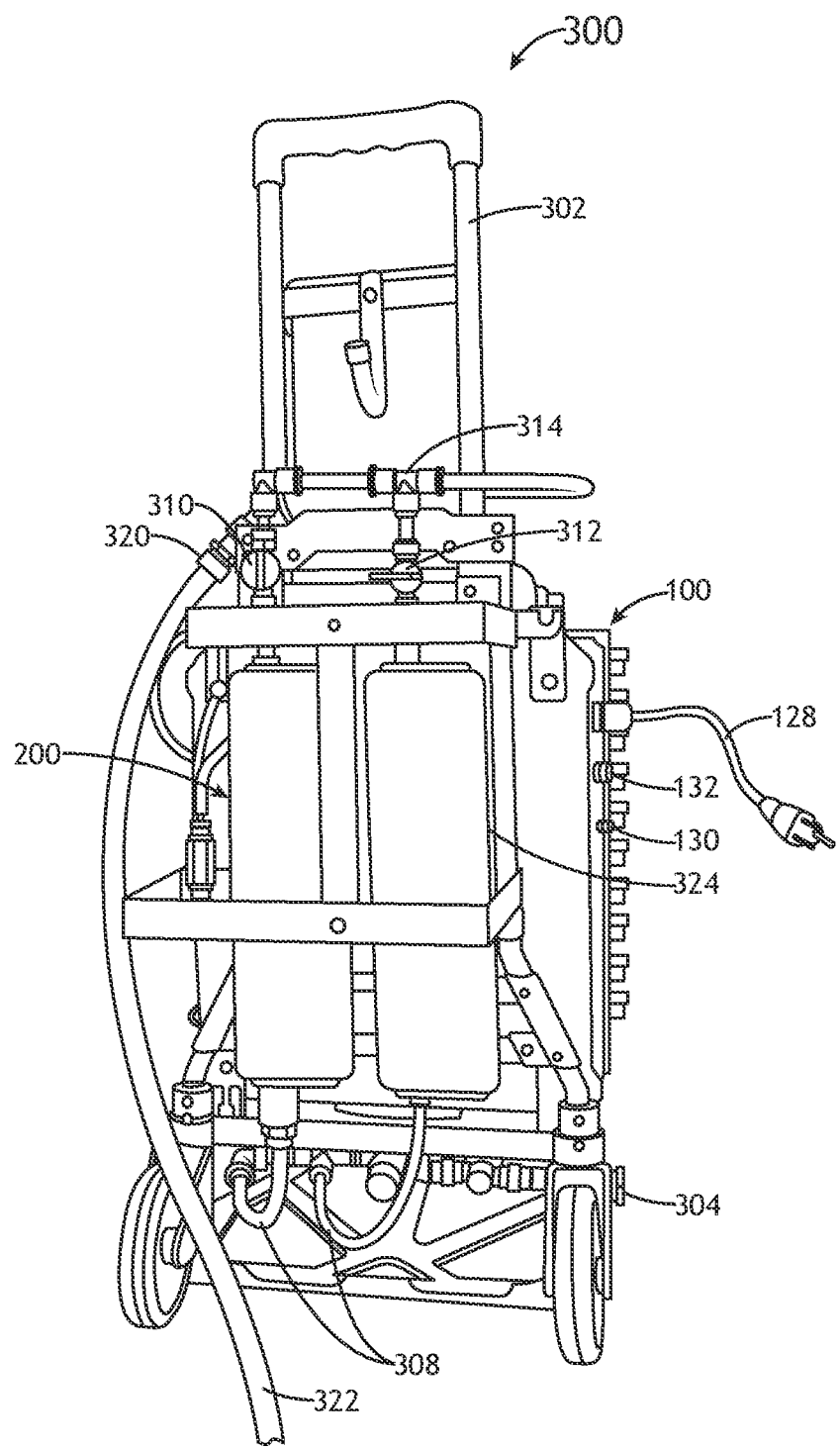
FIG. 2 is a perspective rear view of the transportable system illustrated in FIG. 1, in accordance with one or more embodiments of this disclosure.

FIGS. 1 through 8B illustrate a transportable system 300 for generating aqueous ozone solution, in accordance with one or more embodiments of this disclosure. As shown in FIGS. 1 and 2, the system includes an ozone supply unit 100 configured to output ozone for creating an ORP in water and structurally isolated mixing assemblies 200 and 324 for in-line mixing of the ozone into the water in order to output an aqueous ozone solution (i.e., a water and ozone solution). Although the system 300 is discussed with regard to applications that employ water to generate a water and ozone solution, it is contemplated that the system 300 may be configured to generate other types of ozonated fluid solutions for the purposes of cleansing, degreasing, decontaminating, and/or fluid treatment.

In embodiments, the ozone supply unit 100 and the mixing assemblies 200 and 324 are coupled (e.g., mounted or fastened) to a hand truck 302 for transporting the system 300 to any desired location. The hand truck 302 includes a wheeled frame that is configured to carry the ozone supply unit 100, mixing assemblies 200 and 324, and any associated wiring, tubing, and so forth. In some embodiments, the hand truck 302 has the ozone supply unit 100 mounted to a front of the hand truck 302 and the mixing assemblies 200 and 324 mounted to a back of the hand truck 302. In other embodiments, the locations of the ozone supply unit 100 and the mixing assemblies 200 and 324 may be reversed. It is noted that the term "hand truck" should be understood to include functional equivalents (e.g., a dolly or any other wheeled frame).

As shown in FIG. 1, the ozone supply unit 100 may include an ozone supply unit enclosure 102. In embodiments, the ozone supply unit enclosure 102 the ozone supply unit enclosure 102. While the ozone supply unit enclosure 102 and mixing assemblies 200 and 324 are separate structures, the ozone supply unit enclosure 102 and the mixing assemblies 200 and 324 are still fluidically coupled by one or more tubes (e.g., flexible tubing, pipes, etc.) for transferring ozone from the ozone supply unit 100 to the mixing assemblies 200 and 324. Furthermore, in some embodiments, one of the mixing assemblies (e.g., a primary mixing assembly 200) may be coupled (e.g., mounted or fastened) to an external sidewall of the ozone supply unit enclosure 102.

The ozone supply unit enclosure 102 may have a securable lid/cover 104 that can enclose (e.g., when secured/closed) and provide access to (e.g., when removed/opened) the components housed in an interior portion of the ozone supply unit enclosure 102. As shown in FIG. 1, the securable lid/cover 104 may be secured to the ozone supply unit enclosure 102 by a hinge on one side and a latch or fastener on an opposing side. In other embodiments, the securable lid/cover 104 may be secured to the ozone supply unit enclosure 102 by one or more fasteners (e.g., screws to mate with bores in the ozone supply unit enclosure 102, latches, interference fit fasteners, clipping fasteners, magnetic fasteners, or the like). In some embodiments, the ozone supply unit 100 may have one or more vents (e.g., vents 106 and 108, both shown in FIG. 4) in the ozone supply unit enclosure 102 and/or lid/cover 104 to let hot air (exhaust) out of the ozone supply unit 100 and/or let ambient air into the ozone supply unit 100 to prevent the internal components (e.g., ozone generators, controllers, relays, etc.) of the ozone supply unit 100 from overheating. As shown in FIG. 2, the ozone supply unit enclosure 102 may further include ports/openings for a power cable 128, a switch 130 to engage or disengage power to the ozone supply unit 100, an indicator 132 (e.g., a light source), or any combination thereof.

Figure 4:
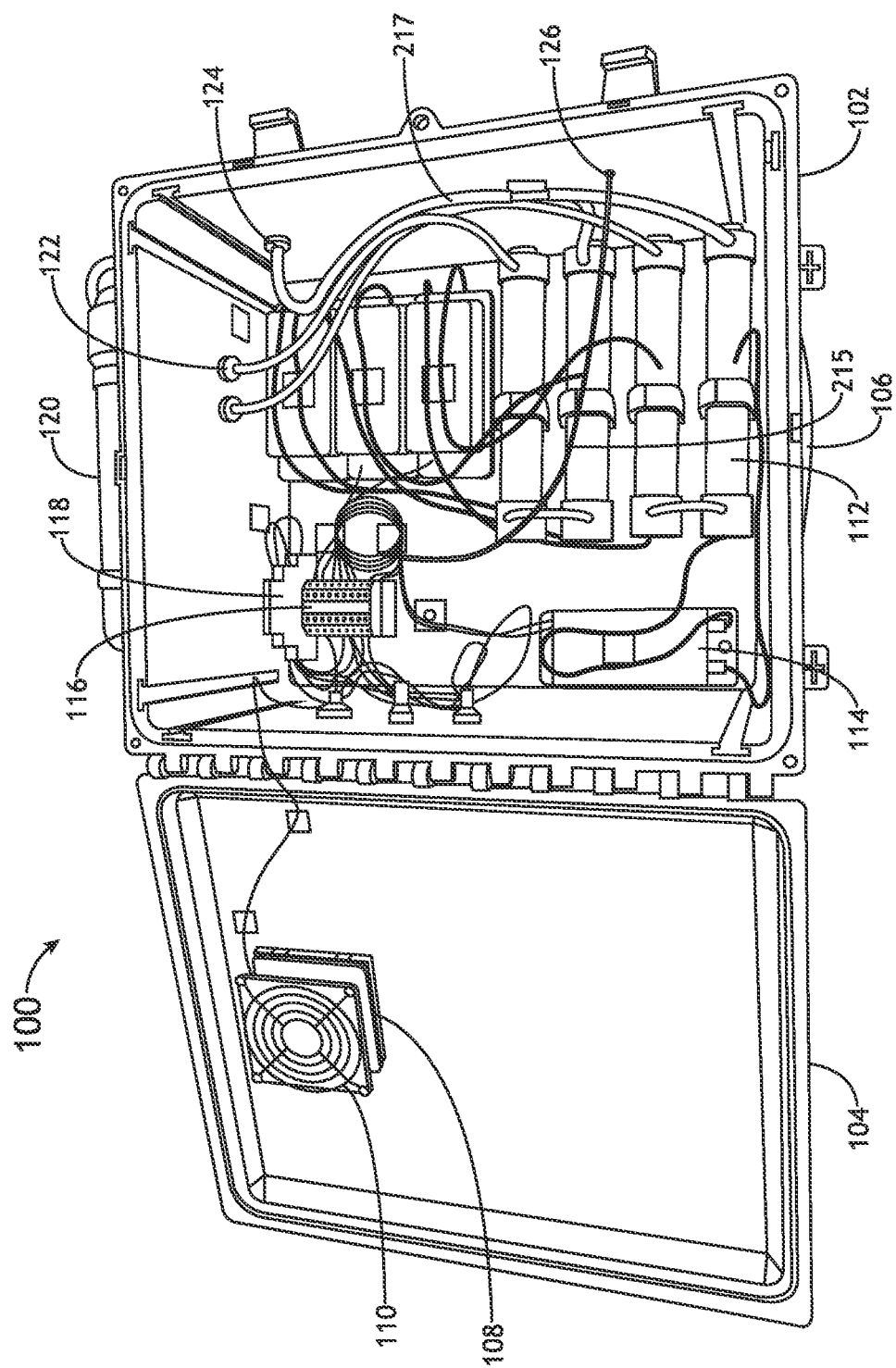
FIG. 4 is a perspective front view of an ozone supply unit of the transportable system illustrated in FIG. 1, wherein the ozone supply unit is opened up to show ozone generation components contained within the ozone supply unit enclosure, in accordance with one or more embodiments of this disclosure.

FIG. 4 illustrates the ozone supply unit 100 with the lid/cover 104 opened or removed from the ozone supply unit enclosure 102, in accordance with one or more embodiments of this disclosure. As shown in FIG. 4, one or more of the vents (e.g., vent 108) may be coupled to an exhaust fan 110 configured to blow hot air out of the ozone supply unit 100 when the ozone supply unit 100 is running. The ozone supply unit enclosure 102 also includes one or more air intake ports 122 and one or more ozone output ports 124.

The ozone supply unit 100 includes a plurality of ozone generators 112 (e.g., four ozone generators 112) disposed within the ozone supply unit enclosure 102. The ozone generators 112 are fluidically coupled to the one or more air intake ports 122 and the one or more ozone output ports 124 of the ozone supply unit enclosure 102. One or more controllers 114 (e.g., four controllers 114) may also be disposed within the ozone supply unit enclosure 102. The one or more controllers 114 may be communicatively coupled to the ozone generators 112.

In embodiments, each of the ozone generators 112 may include a corona discharge tube configured to use oxygen supplied via the one or more air intake ports 122 to generate ozone, such as through splitting of oxygen molecules in the air through electrical discharge caused by supplying power to a dielectric material within the corona discharge tube. For example, each ozone generator 112 may include an input port that is fluidically coupled to an air intake port 122 and to convert oxygen from incoming air into ozone. The ozone generators 112 may be powered by a power source 118 (e.g., a 120V/240V power supply circuit coupled to the power cable 128). A power signal from power source 118 may be transformed via a transformer suitable for applying the voltage to the dielectric within the corona discharge tube of the ozone generator 112. For example, a transformer may be coupled to or integrated within a controller 114 for each ozone generator 112 or one controller 114 that controls a plurality of ozone generators 112. In some embodiments, each controller 114 includes a logic circuit (e.g., processor) that is programmed to selectively activate or deactivate one or more connected ozone generators 112. In other embodiments, each controller 114 is simply a transformer that passively activates one or more connected ozone generators 112 when power is supplied to the controller 114 and deactivates the one or more connected ozone generators 112 when the controller 114 is disconnected from power. The ozone supply unit 100 may include a relay 116 (e.g., a switchboard with analog or digital logic circuits) that controls distribution of power and/or communication signals withing the ozone supply unit 100. For example, the relay 116 may be connected to the power source 118, the power switch 130, the indicator 132, the one or more controllers 114 and/or ozone generators 112, and any sensors/switches of the system 300 (e.g., flow switches 214 and 336, both shown in FIG. 5).

In some embodiments, the ozone generators 112 may be operated at 110 volts/60 Hz and have an operating frequency of about 450 kHz and 550 kHz, with a power rating of less than about 15 watts, and with a unit performance for electrical consumption of about 32 watts. For example, the ozone generators 112 may have an operating frequency of about 480 kHz. Further, the ozone generators 112 can be provided according to ISO 9001 CE standards.

Each of the ozone generators 112 may be configured to produce from about 800 mg ozone per hour to about 1200 mg ozone per hour, although other ranges may be appropriate depending on the application. In some embodiments, each of the ozone generators 112 produces about 1000 mg ozone per hour. The ozone generators 112 may include other methods and systems for generating ozone, including but not limited to, electrochemical cells configured to generate ozone from water by placing an anode and a cathode in contact with opposite sides of a proton exchange membrane (PEM), and supplying power to the cell, whereby water flowing over the surface of the anode breaks down into hydrogen atoms and oxygen atoms that assemble to form $O_3$ (ozone).

The ozone supply unit 100 may further include one or more air dryers 120 (or filters) (e.g., two air dryers 120), which may be externally coupled to the ozone supply unit enclosure 102. The one or more air dryers 120 are configured to remove moisture from air before the air is supplied to the ozone generators 112 through the one or more air intake ports 122. The one or more air dryers 120 may be configured to dry the air to a minus dew point by removing water vapor or moisture therefrom, where the water could inhibit the production of ozone by the ozone generators 112.

In some embodiments, the system 300 may further include an oxygen concentrator configured to supply oxygen-enriched air to the one or more air intake ports 124 of the ozone supply unit 100. For example, the oxygen concentrator may be configured to direct the oxygen-enriched air through the one or more air dryers 120. The oxygen concentrator may also remove moisture from the air. In this regard, the incoming air may undergo two drying stages. The oxygen concentrator may be fluidically coupled to the ozone supply unit 100 (e.g., to the one or more air dryers 120 and/or one or more air intake ports 122) by one or more tubes (e.g., flexible tubing, pipes, etc.) for transferring oxygen-enriched air from the oxygen concentrator to the ozone supply unit 100.

In some embodiments, each air dryer 120 includes or is coupled to an air compressor. The pressure provided by the compressor can vary depending on the water pressure supplied to the system 300, where the pressure applied by the compressor can be balanced based on the flow rate of air received by the ozone generators 112 via the one or more air intake ports 122 and the water pressure supplied to the system 300 to obtain a particular ORP of the water/aqueous ozone solution. For example, the compressor may be configured to compress the filtered air at least about 15 KPa (e.g., more particularly at a pressure of 18 KPa or about 2.6 psi) to provide a gas throughput in each ozone generator 112 of about 8 SCFH (standard cubic feet per hour), where the water pressure in each fluid path is about 50 psi to 55 psi (e.g., a reasonable rating for many residential and commercial facilities), to provide an ORP in the water/solution at the aqueous ozone solution output port of at least about 600 mV (e.g., about 600 mV to about 1000 mV, more particularly about 700 mV to about 900 mV). At these pressures, each ozone generator 112 may have a residence time of the gas of about three seconds. The pressure applied by the compressor can affect the rate at which the gas flows through an ozone generator 112, which can affect contact time of the air with the components of the ozone generator 112, which can also affect mass gas transfer rates within the ozone generator 112.

The ozone supply unit 100 may include a plurality of ozone generators 112. For example, in an embodiment illustrated FIG. 4, the ozone supply unit 100 includes four ozone generators 112. At least two of the ozone generators 112 may be fluidically connected in parallel between the one or more air intake ports 122 and the one or more ozone output ports 124. For example, a first set of ozone generators 112 (in series) and a second set of ozone generators 112 (in series) are connected together in parallel between the air intake ports 122 and the ozone output port 124. In some embodiments, one or more splitters/combiners are used to fluidically couple each pair/set of ozone generators 112 in parallel with another pair/set of ozone generators 112.

The ozone supply unit 100 may also include two or more ozone generators 112 connected in series with one other. For example, in the embodiment illustrated in FIG. 4, a first set of ozone generators 112 are connected together in series, and a second set of ozone generators 112 are also connected together in series. Such configurations may provide increased ozone output and/or backup ozone generators 112 in case of malfunction or inoperability of one or more of the other ozone generators 112. On average, each ozone generator 112 may have an operating life of about 10,000 working hours.

The system 300 may include any number of mixing assemblies fluidically coupled to the ozone supply unit 100. In the drawings, the system 300 is shown to include a primary mixing assembly 200 and a secondary mixing assembly 324; however, in other embodiments, the system 300 may include only a primary mixing assembly 200 or a primary mixing assembly 200 with multiple secondary mixing assemblies 324. Furthermore, the primary mixing assembly 200 and the secondary mixing assembly (or assemblies) 324 may be differently structured (e.g., as shown in FIG. 5, where the primary mixing assembly 200 is more complex than the secondary mixing assembly 324), or alternatively the primary mixing assembly 200 and one or more secondary mixing assemblies 324 may have identical or nearly identical structural configurations.

Figure 5:
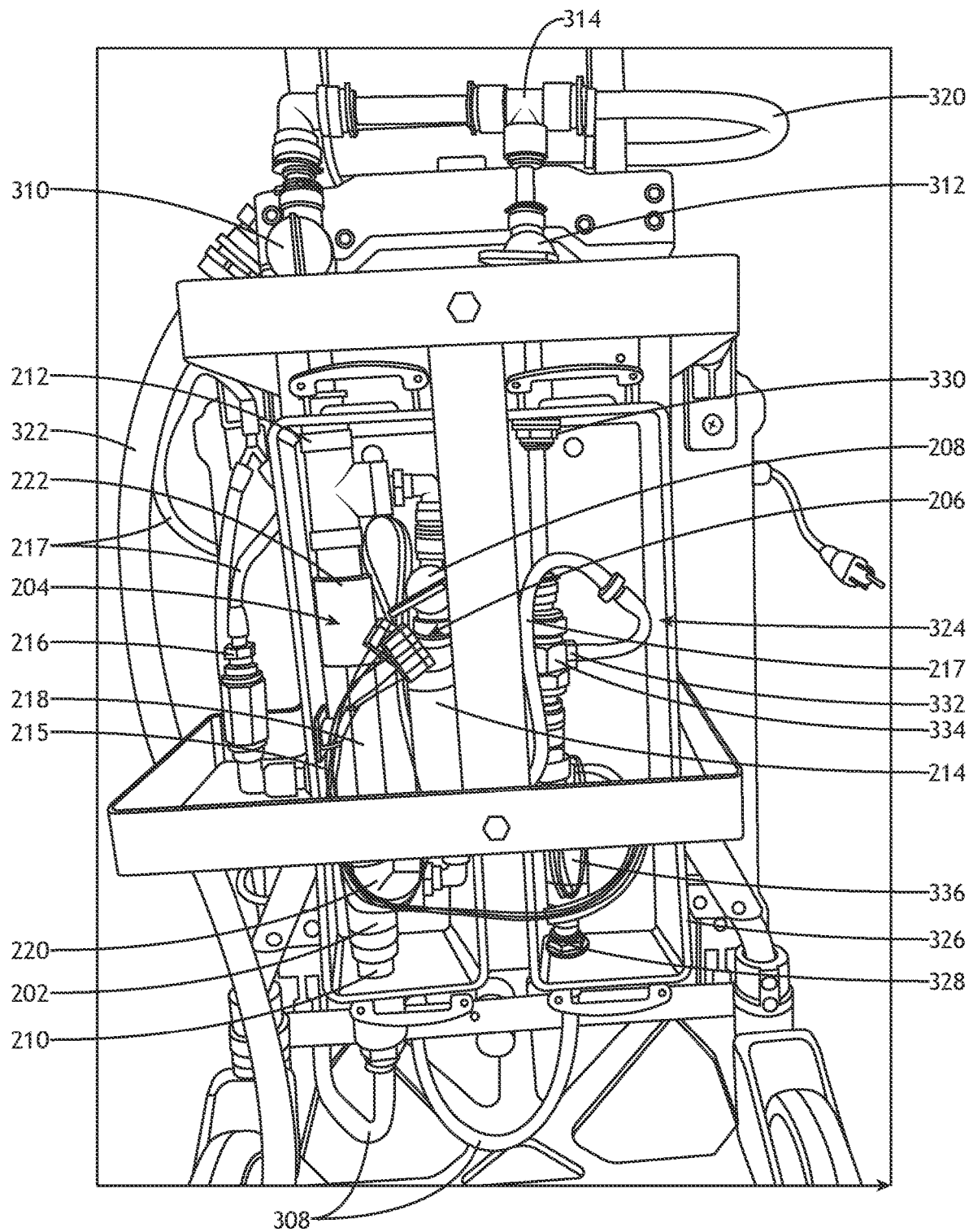
FIG. 5 is a perspective rear view of a portion of the transportable system illustrated in FIG. 1, showing primary and secondary auxiliary compartments of the transportable system, wherein the auxiliary compartments are opened up to show aqueous ozone mixing assemblies contained within the auxiliary compartments, in accordance with one or more embodiments of this disclosure.

FIG. 5 illustrate the mixing assemblies 200 and 324, in accordance with one or more embodiments of this disclosure. As shown in FIG. 5, the primary mixing assembly 200 includes a first flow path 204 for water/solution to flow through. The first flow path 204 may include one or more pipe segments and/or fittings that define a first fluid pathway between a water input port 210 and an aqueous ozone solution output port 212 of the primary mixing assembly 200. The first flow path 204 includes one or more ozone intake ports 216 that are fluidically coupled to the one or more ozone output ports 124 of the ozone supply unit enclosure 102. In embodiments, one or more ozone intake ports 216 of the primary mixing assembly 200 are fluidically coupled to the one or more ozone output ports 124 of the ozone supply unit 100 by one or more tubes 217 (e.g., flexible tubing, pipes, etc.) for transferring ozone from the ozone supply unit 100 to the primary mixing assembly 200.

Figure 3:
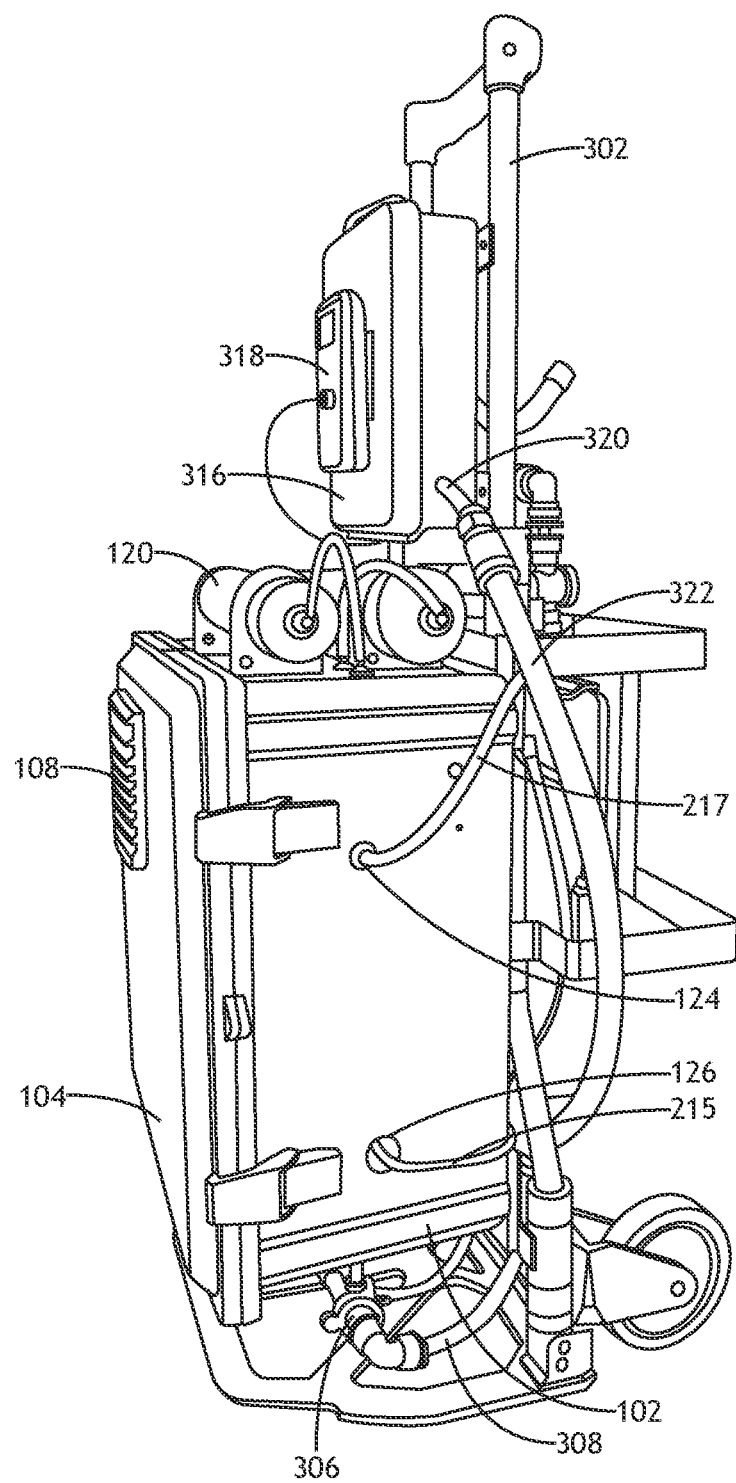
FIG. 3 is a perspective left side view of the transportable system illustrated in FIG. 1, in accordance with one or more embodiments of this disclosure.

For example, the tubes 217 extending from the ozone supply unit enclosure 102 and the primary mixing assembly 200 are shown in FIGS. 3 through 5.

The primary mixing assembly 200 further includes a second flow path 206 fluidically coupled in parallel with the first flow path 204. For example, the second flow path 206 includes one or more pipe segments and/or fittings that define a second fluid pathway in parallel with the first fluid pathway (first flow path 204) between the water input port 210 and the aqueous ozone solution output port 212 of the primary mixing assembly 200. The second flow path 206 may form a D or P shaped branch out of the first flow path 204. This structural arrangement may help maintain more water flow through the first flow path 204 than the second flow path 206.

The second flow path 206 includes a control valve 208 that is configured to selectively permit (or restrict) water flow through the second flow path 206. When the control valve 208 is opened to permit a portion of the water to flow through the second flow path 206, the fluid action produces a negative pressure in the first flow path 204. The negative pressure then causes ozone from the ozone supply unit 100 to be drawn into the first flow path 204 through the one or more ozone intake ports 216 and mixed into the water flowing through the first flow path 204. In some embodiments, the control valve 208 is adjustable to vary the negative pressure produced in the first flow path 204 in order to control an ozone concentration of the aqueous ozone solution output by the system 300. For example, the control valve 208 may be adjustable to control the flow rate of water through the second flow path 206 in order to increase/decrease suction through the one or more ozone intake ports 216. In some embodiments, the level of suction (and hence the ozone concentration of the resulting aqueous ozone solution) can be increased by increasing the flow rate of water through the second flow path 206; and similarly, the level of suction (and hence the ozone concentration of the resulting aqueous ozone solution) may be reduced by decreasing the flow rate of water through the second flow path 206. Some configurations may be reversed such that the level of suction (and hence the ozone concentration of the resulting aqueous ozone solution) can be increased by decreasing the flow rate of water through the second flow path 206, and the level of suction (and hence the ozone concentration of the resulting aqueous ozone solution) may be reduced by increasing the flow rate of water through the second flow path 206.

In embodiments, the first flow path 204 includes a fluid mixer 218 that is coupled to or integrated within the first flow path 204. For example, the fluid mixer 218 may be removably coupled between two pipe fittings (e.g., pipe fittings 220 and 222) to allow for easy removal or replacement of the fluid mixer 218 if needed. The fluid mixer 218 may be configured to introduce/inject ozone generated by the ozone generators 112 into the water flowing through the first flow path 204. For example, the fluid mixer 218 may include and/or may be fluidically coupled to the ozone intake port 216 and configured to inject at least a portion of the ozone received via the ozone intake port 216 into the water flowing through the first flow path 204.

The fluid mixer 218 may be a multi-port coupler including an inlet, an outlet, and an ozone input port (e.g., ozone intake port 216) between the inlet and the outlet. The multi-port coupler may simply be pipe/tube fittings with an ozone input port (e.g., ozone intake port 216) formed therein, 3-way pipe/tube fittings, or the like.

In some embodiments, the multi-port coupler includes a venturi. A venturi can include an injector venturi design (e.g., a "T" design), where the venturi is coupled between the water input port and the aqueous ozone solution output port, and where ozone is introduced to the venturi through another port (i.e., the ozone input port) positioned perpendicular to the flow path of the water (from the water input port to the aqueous ozone solution output port). During operation, ozone generated by the ozone generators 112 is drawn into the venturi and mixed with the water stream flowing from the water input port to the aqueous ozone solution output port. A pressure differential between the water input port and the aqueous ozone solution output port may serve to facilitate drawing the ozone into the venturi and to facilitate mixing of the ozone and the water. In some embodiments, a pressure differential greater than 20 psi inlet over outlet (e.g., at least a 20 psi difference between the water input port and the aqueous ozone solution output port, with pressure higher at the water input port) is provided to generate negative suction in the venturi to thereby draw in the generated ozone, while assuring the energy for water flow and pressure for operation of the venturi.

In order to further increase effectiveness of the mixing process delivered by the venturi, the water and ozone solution may pass through an in-line mixer coupled between the venturi and the aqueous ozone solution output port. In this regard, the fluid mixer 218 may include a combination of a venturi and an in-line mixer, or another type of multi-port coupler with an in-line mixer. The in-line mixer can facilitate further breaking or mixing of ozone bubbles already introduced to the water to generate a mixture (or solution) of water and substantially uniform-sized ozone bubbles. The small uniform-size ozone bubbles can adhere to each other to lower the surface tension of the water and ozone solution. For example, water can have a surface tension of about 72 Millinewtons, whereas the solution of water and substantially uniform-sized ozone bubbles can have a surface tension of about 48-58 Millinewtons. In embodiments, the in-line mixer has an internal diameter that equals an internal diameter of the output port of the venturi to which the in-line mixer is coupled. The same internal diameter can provide an uninterrupted transition of the fluid flowing from the venturi to the in-line mixer, such as to maintain a vortex action or mixing action of the water and the ozone bubbles. The in-line mixer also provides increased contact time between the water and ozone bubbles and can facilitate preparation of uniform ozone bubble size. In some embodiments, the in-line mixer has a length of about two inches downstream from the venturi, which can allow sufficient time for the velocity of the vortex action caused by the pressure differential of the venturi to crush the gaseous bubbles entrained in the solution into uniformed size bubbles. The in-line mixer can also reintroduce undissolved gas back into the solution resulting in increased efficiency as well as reduced off-gas at the point of application. The in-line mixer can include multiple chambers through which the water and ozone solution flows. The size of the chambers can be determined based on the water flow (e.g., throughput), gas mixing, and desired time exposure. In some embodiments, operation of the system 300 produces a water stream at the aqueous ozone solution output port having a molar concentration of ozone of at least 20%, or more particularly at least 25%, far surpassing previous systems that have mass gas transfer rates of less than 10%.

In some embodiments, the primary mixing assembly 200 is contained within an auxiliary compartment 202. The auxiliary compartment 202 includes a plurality of openings including, but not limited to: a first opening for the water input port 210, a second opening for the aqueous ozone solution output port 212, and a third opening for the one or more ozone intake ports 216. In some embodiments, the first and second openings for the water input port 210 and the aqueous ozone solution output port 212, respectively, are directly across from one another on opposite ends of the auxiliary compartment 202. The third opening (or openings) for the one or more ozone intake ports 216 may be located on a surface of the auxiliary compartment 202 that is perpendicular to the opposite ends of the auxiliary compartment 202 that include the first and second openings.

The auxiliary compartment 202 may further have a securable lid/cover (not shown in FIG. 5) that encloses the flow paths 204 and 206 of the primary mixing assembly 200 within the auxiliary compartment 202 when it is secured and provides access to the flow paths 204 and 206 of the primary mixing assembly 200 when it is removed. The securable lid/cover may be secured to the auxiliary compartment 202 by one or more fasteners (e.g., screws to mate with bores in the auxiliary compartment 202, latches, interference fit fasteners, clipping fasteners, magnetic fasteners, or the like). In other embodiments, the securable lid/cover may be secured by a hinge on one side and a latch or fastener on an opposing side.

The ozone supply unit 100 may be communicatively coupled to a flow switch 214 configured to detect water flow through a fluid pathway of the system 300. As shown in FIG. 5, the flow switch 214 may be coupled to or integrated within the second flow path 206. For example, the flow switch 214 may be fluidically coupled between the control valve 208 and either of the water input port 210 or the aqueous ozone solution output port 212. In some embodiments, the water input port 210 and the aqueous ozone solution output port 212 are located on opposite sides of the auxiliary compartment 202, allowing for a linear (e.g., horizontal/vertical) flow path through the auxiliary compartment 202. In other embodiments, the flow switch 214 may be external to the auxiliary compartment 202 and/or at a distance from the auxiliary compartment 202. For example, the flow switch 214 may be coupled to any of the fluid pathways for water flow through the system 300.

The flow switch 214 can be configured to provide electric signals indicative of water flow through the system 300 (e.g., by sensing flow through the second flow path 206, or another fluid pathway in alternative embodiments). For example, the flow switch 214 may be a mechanical flow switch/sensor, electromagnetic flow switch/sensor, pressure-based flow switch/sensor, optical flow switch/sensor, or the like, configured to provide an electric signal indicative of a flow of fluid (e.g., water) through the system 300. In some embodiments, the flow switch 214 may be a solenoid-based flow switch/sensor, such as to avoid significant restriction of flow through the system 300.

In embodiments, the flow switch 214 is configured to transmit one or more control signals to the one or more controllers 114 in response to sensing a flow of water through the system 300 (e.g., through the second flow path 206, or another fluid pathway in alternative embodiments). In response to receiving the one or more control signals, the one or more controllers 114 are configured to cause the ozone generators 112 to generate ozone. In some embodiments, the controllers 114 are simply transformers that become activated by control signals (e.g., status/power signals) transmitted by the flow switch 214 in response to sensing a flow of water. In other embodiments, the controllers 114 may further include microprocessors, microcontrollers, or other programmable logic devices. In such embodiments, the one or more controllers 114 may be configured (e.g., programmed) to activate the transformers and/or ozone generators 112 in response to the control signals (e.g., status signals) and possibly based on other sensor signals being monitored by the one or more controllers 114.

The flow switch 214 may be communicatively coupled to the one or more controllers 114 by one or more connectors 215 (e.g., wires, cables, optical fibers, etc.) for transmitting signals between the flow switch 214 and the one or more controllers 114. For example, as shown in FIGS. 3 through 5, the flow switch 214 may be communicatively coupled to the ozone supply unit 100 by one or more connectors 215 that are fed through or connected to an opening/port 126 in the ozone supply unit enclosure 102.

As discussed above, the ozone supply unit 100 may include a relay 116 that distributes the incoming signals to the one or more controllers 114. In embodiments, the flow switch 214 is communicatively coupled to the relay 116 by the one or more connectors 215. The relay 116 may be configured to transmit the control signals from the flow switch 214 to the controllers 114, whereby the controllers 114 are programmed to activate the ozone generators 112 in response to receiving one or more control signals indicating a flow of water through the system 300. Alternatively, the relay 116 itself may be configured to connect the controllers/transformers 114 to power (or to directly power the ozone generators 112 if no controllers/transformers 114 are present) in response to receiving one or more control signals indicating a flow of water through the system 300. In further embodiments, the ozone supply unit 100 may include a wireless communication interface (e.g., wireless receivers, transmitters, and/or transceivers) for receiving signals from the flow switch 214. For example, the flow switch 214 and one or more of the controllers 114 and/or relay 116 may include or may be coupled with wireless communication interfaces (e.g., wireless transmitters, receivers, and/or transceivers) for sending and/or receiving wireless communication/control signals.

The system 300 may be configured to dispense water and ozone solution to provide water having an ORP of between 600 mV and 1000 mV to provide pathogenic control without introduction of harsh treatment chemicals, such as chlorine. After operation of the system 300, the output water and ozone solution can provide removal of organic and inorganic compounds, can provide removal of micro-pollutants (e.g., pesticides), can provide enhancement of the flocculation/coagulation decantation process, can provide enhanced disinfection while reducing disinfection by-products, can provide odor and taste elimination of the treated water, and so forth. The solubility of ozone in water is quite good, about 10 to 15 times greater than for oxygen under normal drinking water treatment conditions. About 0.1 to 0.6 liters of ozone will dissolve in one liter of water. The size of the ozone gas bubble in the system 300 can influence gas transfer characteristics. In some embodiments, the primary mixing assembly 200 generates an ozone bubble size of about 2 to about 3 microns. For instance, micro-bubbles can be produced mixing assembly 200 and/or sheared into uniformed micro-size bubbles as the solution passes through the fluid pathways.

Corona discharge ozone can be used virtually anywhere. Since ozone is made on site, as needed and where needed, there is no need to ship, store, handle or dispose of it, nor any containers associated with shipping, storing, handling, and disposing a treatment chemical, as is the situation with most chemicals utilized in water treatment.

The system 300 may be configured to provide indications pertaining to the operation status of the system 300, such as to ensure proper operation, or to provide an indication regarding a need for adjustment, servicing, or maintenance. For example, the flow switch 214 may be configured to send the signal to the indicator 132 that provides a visual, tactile, or audible indication that the fluid (e.g., water) is flowing through the system 300. In some embodiments, the indicator 132 is a light source (e.g., an LED) configured to illuminate upon receiving a signal from the flow switches. The indicator 132 may also be coupled to a sensor (e.g., a relay) configured to measure that a voltage is applied to ozone generators 112. When a proper voltage is applied to the ozone generators 112, the sensor can send a signal to the indicator. In some embodiments, the indicator 132 will provide a visual, tactile, or audible indication when each sensor and the flow switch 214 provide their respective signals to the indicator 132. For example, the relay 116 can be coupled to the power source 118 and the flow switch 214. The relay 116 may be configured to send an activation signal to the indicator 132 when the power source 118 is providing power to the ozone generators 112 and when the flow switch 214 provides one or more signals regarding fluid flow through the system 300. In such a configuration, the indicator 132 can verify that the system 300 is operating under design conditions (e.g., having an active flow of water, and having a sufficient power supply to the ozone generators 112).

In some embodiments, the system 300 may include an in-line ORP meter (e.g., ORP sensor and monitor) positioned to measure the ORP of the water and ozone solution, such as adjacent a water inlet, water/solution outlet, coupled within a distribution line, or the like. The in-line ORP meter can be coupled with the relay 116, such that the in-line ORP meter provides a signal to the relay 116 upon detection of a desired ORP or range of ORPs (e.g., at least 600 mV, at least 650 mV, at least 700 mV, at least 750 mV, at least 800 mV, at least 850 mV, at least 900 mV, at least 950 mV, etc.). The relay 116 can then provide an activation signal to the indicator 132 upon proper functioning of the system 300 (e.g., when the power source 118 is providing power to the ozone generators 112, when the flow switch 214 provides one or more signals regarding fluid flow through the system 300, and when the in-line ORP meter detects a desired ORP of the water and ozone solution generated by the system 300). When the indicator 132 is not activated, this can provide an indication that a component or components of the system 300 may need adjustment, servicing, or maintenance. Alternatively, the system 300 can be configured to activate the indicator 132 upon failure of one or more of the components of the system 300 (e.g., no power supplied to the ozone generators 112, no flow of water detected by the flow switch 214, or an out of range ORP detected by the in-line ORP meter).

In some embodiments, the system 300 includes primary mixing assembly 200 and at least one secondary mixing assembly 324, all of which are fluidically and communicatively coupled to the ozone supply unit 100.

Figure 6A:
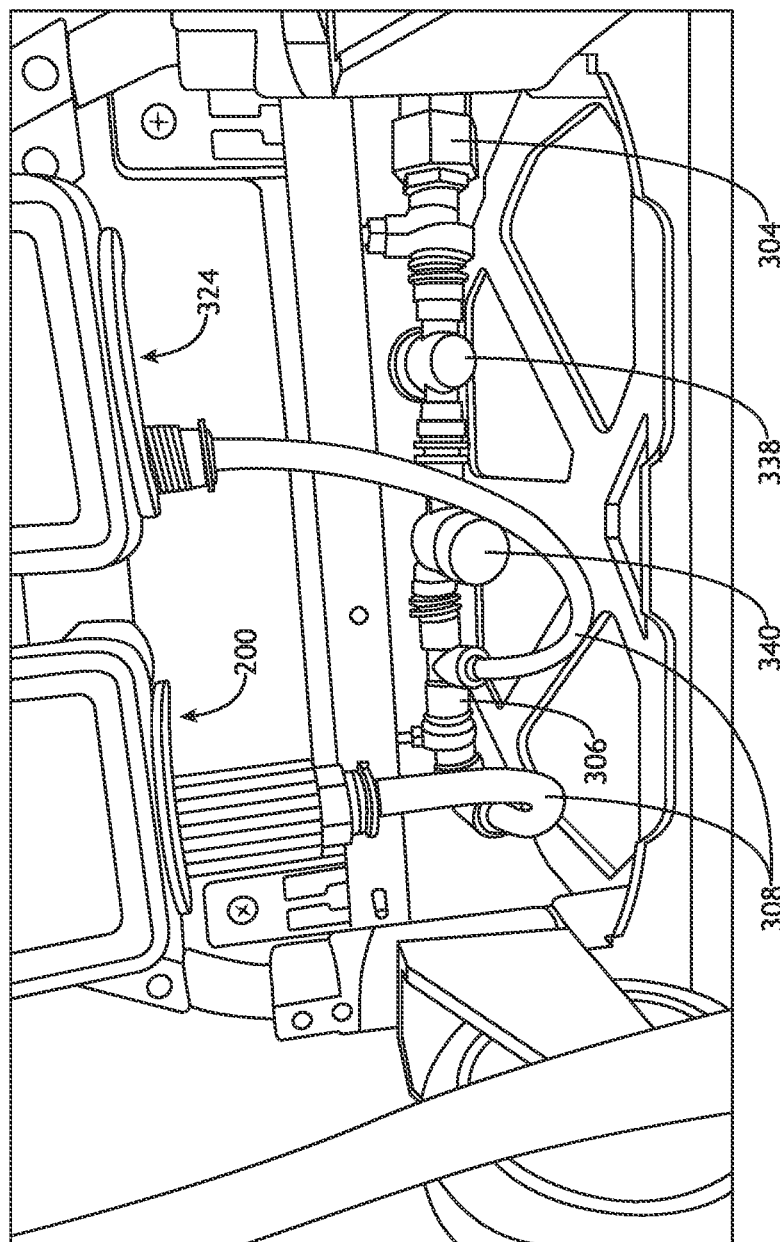
FIG. 6A is a perspective rear view of a portion of the transportable system illustrated in FIG. 1, showing an input path for supplying water to the mixing assemblies of the primary and secondary auxiliary compartments of the transportable system, in accordance with one or more embodiments of this disclosure.
Figure 6B:
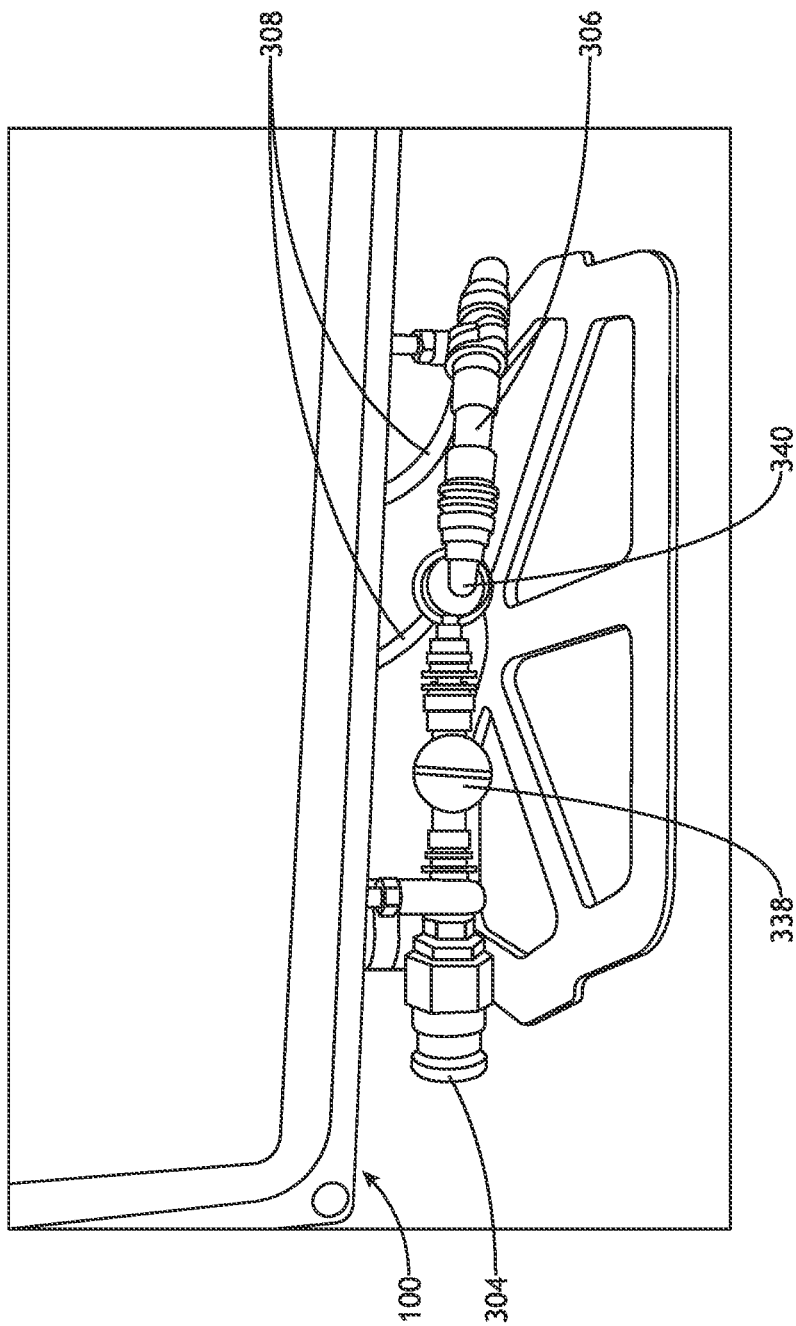
FIG. 6B is a perspective front view of a portion of the transportable system illustrated in FIG. 1, showing the input path for supplying water to the mixing assemblies of the primary and secondary auxiliary compartments of the transportable system, in accordance with one or more embodiments of this disclosure.

As shown in FIGS. 6A and 6B, the system 300 includes an input path that delivers water from a water source to an input manifold/splitter 306 configured to distribute portions of the incoming water to respective water inlets of the primary and secondary mixing assemblies 200 and 324 (e.g., via tubes 308). When there are multiple secondary mixing assemblies 324, the system 300 may further include a second splitter, or manifold/splitter 306 may be 1-to-N manifold/splitter, where N is greater than 2. The input path may include, but is not limited to, a water input port 304, a stop valve 338 (for turning on/off the water flow), and a sediment filter 340.

In some embodiments, the aqueous ozone solution outlet of the secondary mixing assembly 324 is coupled to a stop valve 312 for selectively permitting or preventing water flow through the secondary mixing assemblies 324. For example, to disable the secondary mixing assembly 324, the stop valve 312 for that mixing assembly can be closed to prevent water from flowing through the mixing assembly, thereby preventing the secondary mixing assembly 312 from generating aqueous ozone solution. In alternative embodiments, the stop valve 312 may be coupled to the mixing assembly outlet or located within the secondary mixing assembly 324 while still functioning in the substantially the same way. Similarly, the primary mixing assembly 200 may also be coupled to a stop valve 310 for selectively permitting or preventing water flow through the primary mixing assembly 200.

The stop valves 310 and 312 may be used to selectively connect one or more of the mixing assemblies 200 and 324 to an output line 320, i.e., by opening selected ones of the stop valves 310 and 312 to allow water flow through one or more of the mixing assemblies 200 and 324. For example, if stop valve 310 is open and stop valve 312 is closed, then only the primary mixing assembly 200 will be able to output aqueous ozone solution to the output line 320 that leads to one or more output applications (e.g., a hose 322 for connecting to a faucet, fill/output line, spray gun, etc.). In another example configuration, if stop valve 310 and stop valve 312 are both open, then the primary mixing assembly 200 and the secondary mixing assembly 324 will be connected in parallel to the output line 320. This may result in an increased flow rate (e.g., total flow rate=primary mixing assembly flow rate+secondary mixing assembly flow rate). In yet another example configuration, if stop valve 310 is closed and stop valve 312 is open, then only the secondary mixing assembly 324 will be connected to the output line 320. In this case, the total flow rate may equal the secondary mixing assembly flow rate alone. The system 300 may further include at least one splitter/combiner 314 for directing aqueous ozone solution output by the primary mixing assembly 200 and/or the secondary mixing assembly 324 into the output line 320.

In some embodiments, the primary mixing assembly 200 and the secondary mixing assembly 324 may have different flow rates. For example, the primary mixing assembly 200 may have a higher flow rate than the secondary mixing assembly 324 (e.g., primary mixing assembly flow rate of 3 GPM and secondary mixing assembly flow rates of 1.5 GPM); accordingly, it may be possible to selectively connect one or more of the mixing assemblies 200 and 324 to the output line 320 in order to achieve a desired flow rate (e.g., 1.5 GPM, 3 GPM, or 4.5 GPM) from among the possible flow rates that can be output by a selected one of the mixing assemblies or by a selected combination of the mixing assemblies.

Figure 7:
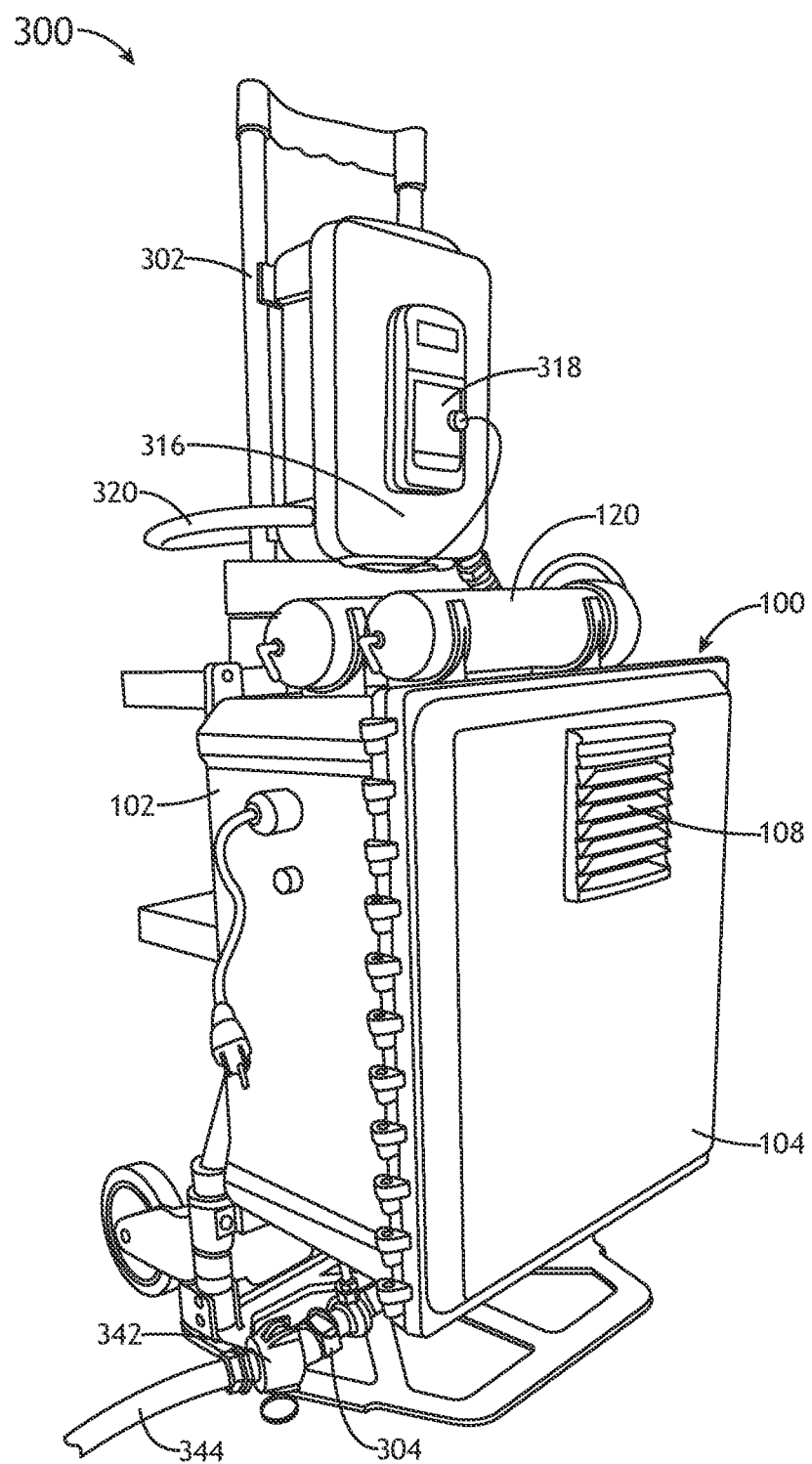
FIG. 7 is a perspective right side view of the transportable system illustrated in FIG. 1, showing a quick connect adapter coupled to a quick connect port of the input path for supplying water to the mixing assemblies of the primary and secondary auxiliary compartments of the transportable system, in accordance with one or more embodiments of this disclosure.

The system 300 may include an ORP monitor 318 configured to detect an ORP of the aqueous ozone solution supplied to the output path by selectively connected ones of the mixing assemblies 200 and 324. For example, as shown in FIG. 7, the output line 320 may include an ORP sensor 316 for detecting an ORP of the aqueous ozone solution (e.g., water and ozone solution) being dispensed by selectively connected ones of the mixing assemblies 200 and 324, where the ORP monitor 318 is communicatively coupled to the ORP sensor 316 and configured to output an ORP value based on the sensor readings.

In some embodiments, the secondary mixing assembly 324 may be structured very similarly to the primary mixing assembly 200. Alternatively, the secondary mixing assembly 324 may have a much simpler structural configuration, especially when the secondary mixing assembly 324 has a lower flow rate than the primary mixing assembly 200. For example, in FIG. 5 the secondary mixing assembly 324 only has a single flow path as opposed to the primary mixing assembly's parallel flow paths with controlled suction.

As shown in FIG. 5, the secondary mixing assembly may include one or more pipe segments and/or fittings that define a fluid pathway between a water input port 328 and an aqueous ozone solution output port 330 of the secondary mixing assembly 324. The flow path includes one or more ozone intake ports 332 that are fluidically coupled to the one or more ozone output ports 124 of the ozone supply unit enclosure 102. In embodiments, one or more ozone intake ports 332 of the secondary mixing assembly 324 are fluidically coupled to the one or more ozone output ports 124 of the ozone supply unit 100 by the one or more tubes 217 (e.g., flexible tubing, pipes, etc.) for transferring ozone from the ozone supply unit 100 to the mixing assemblies 200 and 324.

In embodiments, the flow path includes a fluid mixer 334 that is coupled to or integrated within the flow path. For example, the fluid mixer 334 may be removably coupled between two pipe fittings to allow for easy removal or replacement of the fluid mixer 334 if needed. The fluid mixer 334 may be configured to introduce/inject ozone generated by the ozone generators 112 into the water flowing through the flow path of the secondary mixing assembly 324. For example, the fluid mixer 334 may include and/or may be fluidically coupled to the ozone intake port 332 and configured to inject at least a portion of the ozone received via the ozone intake port 332 into the water flowing through the flow path of the secondary mixing assembly 324.

The fluid mixer 334 may be a multi-port coupler including an inlet, an outlet, and an ozone input port (e.g., ozone intake port 332) between the inlet and the outlet. The multi-port coupler may simply be pipe/tube fittings with an ozone input port (e.g., ozone intake port 332) formed therein, 3-way pipe/tube fittings, or the like.

In some embodiments, the multi-port coupler includes a venturi. A venturi can include an injector venturi design (e.g., a "T" design), where the venturi is coupled between the water input port and the aqueous ozone solution output port, and where ozone is introduced to the venturi through another port (i.e., the ozone input port) positioned perpendicular to the flow path of the water (from the water input port to the aqueous ozone solution output port). During operation, ozone generated by the ozone generators 112 is drawn into the venturi and mixed with the water stream flowing from the water input port to the aqueous ozone solution output port. A pressure differential between the water input port and the aqueous ozone solution output port may serve to facilitate drawing the ozone into the venturi and to facilitate mixing of the ozone and the water. In some embodiments, a pressure differential greater than 20 psi inlet over outlet (e.g., at least a 20 psi difference between the water input port and the aqueous ozone solution output port, with pressure higher at the water input port) is provided to generate negative suction in the venturi to thereby draw in the generated ozone, while assuring the energy for water flow and pressure for operation of the venturi.

In order to further increase effectiveness of the mixing process delivered by the venturi, the water and ozone solution may pass through an in-line mixer coupled between the venturi and the aqueous ozone solution output port. In this regard, the fluid mixer 334 may include a combination of a venturi and an in-line mixer, or another type of multi-port coupler with an in-line mixer. The in-line mixer can facilitate further breaking or mixing of ozone bubbles already introduced to the water to generate a mixture (or solution) of water and substantially uniform-sized ozone bubbles. The small uniform-size ozone bubbles can adhere to each other to lower the surface tension of the water and ozone solution. For example, water can have a surface tension of about 72 Millinewtons, whereas the solution of water and substantially uniform-sized ozone bubbles can have a surface tension of about 48-58 Millinewtons. In embodiments, the in-line mixer has an internal diameter that equals an internal diameter of the output port of the venturi to which the in-line mixer is coupled. The same internal diameter can provide an uninterrupted transition of the fluid flowing from the venturi to the in-line mixer, such as to maintain a vortex action or mixing action of the water and the ozone bubbles. The in-line mixer also provides increased contact time between the water and ozone bubbles and can facilitate preparation of uniform ozone bubble size. In some embodiments, the in-line mixer has a length of about two inches downstream from the venturi, which can allow sufficient time for the velocity of the vortex action caused by the pressure differential of the venturi to crush the gaseous bubbles entrained in the solution into uniformed size bubbles. The in-line mixer can also reintroduce undissolved gas back into the solution resulting in increased efficiency as well as reduced off-gas at the point of application. The in-line mixer can include multiple chambers through which the water and ozone solution flows. The size of the chambers can be determined based on the water flow (e.g., throughput), gas mixing, and desired time exposure. In some embodiments, operation of the system produces a water stream at the aqueous ozone solution output port having a molar concentration of ozone of at least 20%, or more particularly at least 25%, far surpassing previous systems that have mass gas transfer rates of less than 10%.

In some embodiments, the secondary mixing assembly 324 is contained within an auxiliary compartment 326. The auxiliary compartment 326 includes a plurality of openings including, but not limited to: a first opening for the water input port 328, a second opening for the aqueous ozone solution output port 330, and a third opening for the one or more ozone intake ports 332. In some embodiments, the first and second openings for the water input port 328 and the aqueous ozone solution output port 330, respectively, are directly across from one another on opposite ends of the auxiliary compartment 326. The third opening (or openings) for the one or more ozone intake ports 332 may be located on a surface of the auxiliary compartment 326 that is perpendicular to the opposite ends of the auxiliary compartment 326 that include the first and second openings.

The auxiliary compartment 326 may further have a securable lid/cover (not shown in FIG. 5) that encloses the flow path of the secondary mixing assembly 324 within the auxiliary compartment 326 when it is secured and provides access to the flow path of the secondary mixing assembly 324 when it is removed. The securable lid/cover may be secured to the auxiliary compartment 326 by one or more fasteners (e.g., screws to mate with bores in the auxiliary compartment 326, latches, interference fit fasteners, clipping fasteners, magnetic fasteners, or the like). In other embodiments, the securable lid/cover may be secured by a hinge on one side and a latch or fastener on an opposing side.

The ozone supply unit 100 may be communicatively coupled to a flow switch 336 in the secondary mixing assembly 324 that is configured to detect water flow through the flow path of the secondary mixing assembly 324. For example, as shown in FIG. 5, the flow switch 336 may be coupled to or integrated within the flow path (i.e., in line with the fluid mixer 334). In other embodiments, the flow switch 336 may be external to the auxiliary compartment 326 and/or at a distance from the auxiliary compartment 326. For example, the flow switch 336 may be externally coupled to the water input port 328 or the aqueous ozone solution output port 330 of the secondary mixing assembly 324.

The flow switch 336 can be configured to provide electric signals indicative of water flow through the system 300 (e.g., by sensing flow through the flow path of the secondary mixing assembly 324, or another fluid pathway in alternative embodiments). For example, the flow switch 336 may be a mechanical flow switch/sensor, electromagnetic flow switch/sensor, pressure-based flow switch/sensor, optical flow switch/sensor, or the like, configured to provide an electric signal indicative of a flow of fluid (e.g., water) through the secondary mixing assembly 324. In some embodiments, the flow switch 336 may be a solenoid-based flow switch/sensor, such as to avoid significant restriction of flow through the secondary mixing assembly 324.

In embodiments, the flow switch 336 is configured to transmit one or more control signals to the one or more controllers 114 in response to sensing a flow of water through the system 300 (e.g., through the flow path of the secondary mixing assembly 324, or another fluid pathway in alternative embodiments). In response to receiving the one or more control signals, the one or more controllers 114 are configured to cause the ozone generators 112 to generate ozone. In some embodiments, the controllers 114 are transformers that become activated by control signals (e.g., status/power signals) transmitted by the flow switch 336 in response to sensing a flow of water. In other embodiments, the controllers 114 may further include microprocessors, microcontrollers, or other programmable logic devices. In such embodiments, the one or more controllers 114 may be configured (e.g., programmed) to activate the transformers and/or ozone generators 112 in response to the control signals (e.g., status signals) and possibly based on other sensor signals being monitored by the one or more controllers 114.

The flow switch 336 may be communicatively coupled to the one or more controllers 114 by the one or more connectors 215 (e.g., wires, cables, optical fibers, etc.) for transmitting signals between the one or more controllers 114 and the mixing assemblies 200 and 324. For example, as shown in FIGS. 3 through 5, the flow switch 336 may be communicatively coupled to the ozone supply unit 100 by one or more connectors 217 that are fed through or connected to an opening/port 126 in the ozone supply unit enclosure 102.

As discussed above, the ozone supply unit 100 may include a relay 116 that distributes the incoming signals to the one or more controllers 114. In embodiments, the flow switch 336 is communicatively coupled to the relay 116 by the one or more connectors 217. The relay 116 may be configured to transmit the control signals from the flow switch 336 to the controllers 114, whereby the controllers 114 are programmed to activate the ozone generators 112 in response to receiving one or more control signals indicating a flow of water through the system. Alternatively, the relay 116 itself may be configured to connect the controllers/transformers 114 to power (or to directly power the ozone generators 112 if no controllers/transformers 114 are present) in response to receiving one or more control signals indicating a flow of water through the system. In further embodiments, the ozone supply unit 100 may include a wireless communication interface (e.g., wireless receivers, transmitters, and/or transceivers) for receiving signals from the flow switch 336. For example, the flow switch 336 and one or more of the controllers 114 and/or relay 116 may include or may be coupled with wireless communication interfaces for sending/receiving wireless communication/control signals.

In further embodiments, the system 300 may include any number of mixing assemblies 200 and 324 to create a configurable network of mixing assemblies of any size for any number of output applications.

In embodiments, the transportable system 300 can be wheeled to any site that has a water source connection and used to provide aqueous ozone solution at a selected flow rate. For example, in a building the system 300 transported (on demand) to any room, passageway, laboratory, processing facility, etc. This allows for one system 300 to service multiple sites/zones. To further increase efficiency and convenience, the system 300 may include a quick connect port. For example, as shown in FIG. 7, the water input port 304 may be a quick connect port that can be used with a quick connect adapter 342 to very easily couple the water input port 304 to a water source using a hose 344 equipped with the quick connect adapter 342.

Figure 8A:
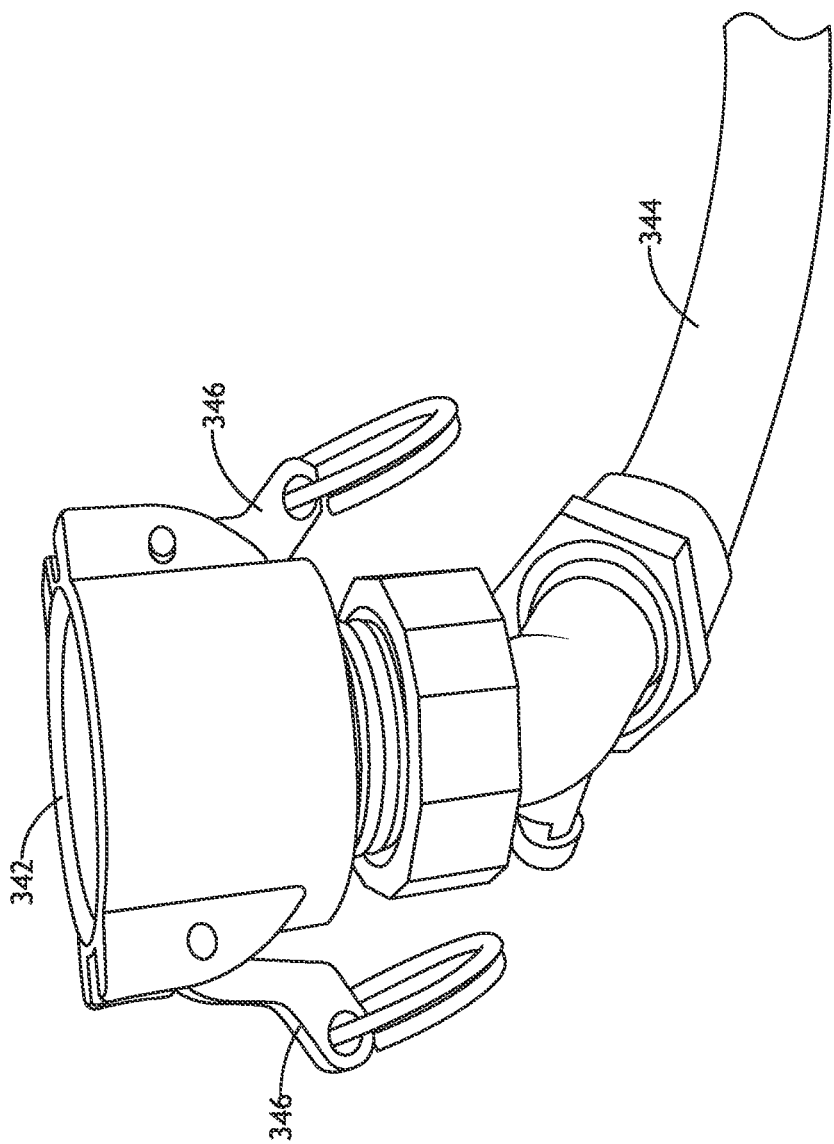
FIG. 8A is a perspective view of the quick connect adapter illustrated in FIG. 7, in accordance with one or more embodiments of this disclosure.
Figure 8B:
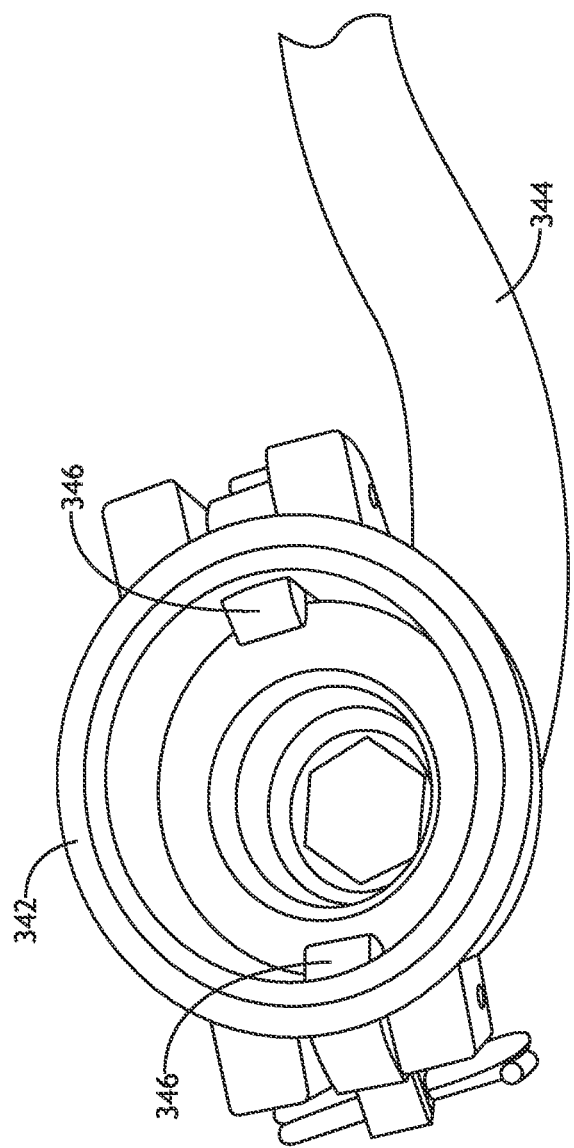
FIG. 8B is an end view of the quick connect adapter illustrated in FIG. 7, in accordance with one or more embodiments of this disclosure.

As shown in FIG. 6B, the water input port 304 (quick connect port) may be fluidically coupled to the manifold/splitter 306 for supplying water to the primary and secondary mixing assemblies 200 and 324, wherein the water input port 304 (quick connect port) is configured to receive the water from a water source (e.g., a main water line, commercial/residential water faucet, or the like) via the hose 344 that is equipped with the quick connect adapter 342 at its output end. In embodiments, the water input port 304 (quick connect port) includes an annular indentation configured to mate with the quick connect adapter 342. For example, as shown in FIGS. 8A and 8B, the quick connect adapter 342 may include two or more latches 346 that are configured to lock into the annular indentation of the water input port 304 (quick connect port) after the quick connect adapter 342 is placed over the water input port 304 (quick connect port) and the latches 346 are flipped from an open configuration to a close configuration (e.g., by pulling the latch levers toward the distal end of the quick connect adapter 346). This action of latching the quick connect adapter 346 onto the water input port 304 (quick connect port) efficiently secures the quick connect adapter 346 and the water input port 304 (quick connect port) together so that the system 300 can then be used with water supplied from the water source. It is contemplated that a building (or any other operational environment) that has multiple water source outlets can be equipped with a plurality of hoses 344 and quick connect adapters 342 at various zones/sites so that the system 300 can be transported to a desired zone/site, connected to the water source using the quick connect coupling interface, and operated onsite to provide aqueous ozone solution for cleansing, disinfecting, degreasing, water purification, etc.

By providing an ORP of between 600 mV and 1000 mV with the system 300, the output aqueous ozone solution (i.e., water and ozone solution) can be utilized to destroy various pathogens, including, but not limited to, algae (e.g., blue-green), bacteria (e.g., *Aeromonas* & *Actinomycetes, Bacillus, Campylobacters, Clostridium botulinum, Escherichia coli* (*E. coli*), *Flavobacterium, Helicobacter* (*pylori*), Heterotrophic Bacteria, *Legionella pneumophila*, *Micrococcus*, *Mycobacterium tuberculosis*, *Pseudomonas aeruginosa*, *Salmonella*, *Shigella* shigellosis (dysentery), *Staphylococcus* sp, *albus*, *aureus*, *Streptococcus*, *Vibrio: alginolyticus*, *anguillarium*, *parahemolyticus*, *Yersinia enterocolitica*), fungi, molds, yeasts, mold spores, nematodes, protozoa (e.g., *Acanthamoeba* & *Naegleria*, Amoeboe Trophozoites, *Cryptosporidium*, *Cyclospora*, *Entamoeba* (*histolytica*), *Giardia lamblia*, *Giardia muris*, *Microsporidium*, *N. gruberi*), trematodes, viruses (e.g., Adenovirus, Astrovirus, Cailcivirus, Echovirus, Encephalomyocarditis, Enterovirus, coxsachie, poliovirus, Hepatitis A, B and C, Myxovirus influenza, Norwalk, Picobirnavirus, Reovirus, Rotavirus).

The water in the water and ozone solution may have a surface tension of about 72 Millinewtons per meter at 20° C. as it enters the system 300. The system 300 may be configured to reduce the surface tension of the water in the water and ozone solution to about 48-58 Millinewtons per meter at 20° C. The reduced surface tension of the water enables the water and ozone solution being sprayed onto the hard surfaces and equipment to remove grease more effectively from hard surfaces and equipment since ozonated fluid is more capable of loosening and disintegrating any biofilm on the hard surfaces or equipment. The reduced surface tension of the water in the water and ozone solution better enables the cleansing of the hard surfaces and equipment since it more easily penetrates foreign material on the hard surfaces and equipment.

In some implementations, the system 300 may be used for water treatment or decontamination as described below.

Microbiological organisms/species can reside in water sources, including water intended for drinking recreation. Among the microbiological threats is the protozoan parasite—*Cryptosporidium* (crypto). Crypto can be a particular challenge for the water treatment industry, however, ozone can eliminate it. Ozone, molecularly known as $O_3$, is a sanitizer and is relentless in its attack of organic microbes (bacteria, viruses, cysts, etc.). Through a process known as lysing, ozone breaks down cell walls or membranes, where it can then destroy the nucleus of the microbe. In addition to sanitation, ozone can provide for the oxidizing of inorganic material that could be present in water, such as metals (e.g., iron and manganese). Although there are a few stronger oxidizers, ozone is the strongest that is readily available for commercial or residential use. For example, ozone is about 1.5 times stronger than chlorine, and can provide a faster oxidizing action. Furthermore, because of this higher oxidation strength, ozone does not build up a tolerance to microbes unlike other sanitizers, such as chlorine. Within the microbial world protozoa, such as crypto, are some of the most resistant to all types of disinfectants. One reason for this resistance is due to its hard outer protective shell, which must be broken through prior to the microbe being inactivated. Crypto can cause a variety of ailments, including abdominal cramping, diarrhea, fever, and nausea that can last as long as a month, according to the Centers for Disease Control and Prevention (CDC). Disinfectants used to ward off *Cryptosporidium* for water treatment applications can include chlorine (liquid state), chloramines, chlorine-dioxide (gaseous state), and ozone. However, their ability to perform this inactivation duty should not be regarded equal, as each sanitizer requires a specific level of concentration and contact time to take effect, as described by the following.

To better determine the specific amount of the disinfectant required to inactivate or destroy a microbe, the Environmental Protection Agency (EPA) has determined Ct Values. These Ct Values are the product of the disinfectant's concentration (C, expressed in mg/L) and the contact time (t, expressed in minutes). These Ct Values are calculated specifically to the percentage of microbial kill or better known as the log reduction, e.g., 1-Log=90.0 percent, 2-Log=99.0 percent or 3-Log=99.9 percent inactivation of the particular microbe. According to the EPA, chlorine dioxide would require a Ct of 226, which would correlate to 226 mg/L, at one minute of contact time, at 25° C. to achieve a 3-Log reduction or 99.9 percent inactivation. Although, ozone would only require a Ct of 7.4, correlating to 7.4 mg/L, to achieve the same 99.9 percent inactivation with the same parameters as chlorine dioxide. Ct is a product of concentration and time, and as such, both can be manipulated, as long as the given Ct Value is obtained for the desired log reduction (e.g., Ozone Ct of 7.4 can be achieved with a concentration 3.7 mg/L for two minutes of time).

*Cryptosporidium* outbreaks in public drinking waters and recreational swimming pools are becoming more and more of an evident issue. Unfortunately, forms of chlorine sanitation are not often the best solution, especially for high organic and inorganic contaminant levels, as they will create chlorine oxidation by-products, such as trihalomethanes (THM) and chloramine derivatives. These by-products are the typical cause of (what most associate as being over chlorinated) the chlorine smell in drinking or pool waters, and are the cause of itchy, smelly skin and burning eyes in pool water. Although with a properly sized system, ozone can be used as the primary sanitizing and oxidizing agent, oxidizing the contaminants completely. Using ozone in this manner would then allow chlorine to be used as the secondary residual sanitizer to satisfy regulatory requirements, without the production of chloramines and chlorine's side effects.

Further, ozone can be used to remove iron and manganese from water, forming a precipitate that can be filtered:

$$2Fe^{2+}+O_3+5H_2O \rightarrow 2Fe(OH)_3(s)+O_2+4H^+$$

$$2Mn^{2+}+2O_3+4H_2O \rightarrow 2MN(OH)_2(s)+2O_2+4H^+$$

Ozone will also reduce dissolved hydrogen sulfide in water to sulfurous acid:

$$3O_3+H_2S \rightarrow 3H_2SO_3+3O_2$$

The reactions involved iron, manganese, and hydrogen sulfide can be especially important in the use of ozone-based well water treatment. Further, ozone will also detoxify cyanides by converting the cyanides to cyanates (on the order of 1,000 times less toxic):

$$CN^-+O_3 \rightarrow CNO^-+O_2$$

Ozone will also completely decompose urea, where recent outbreaks of E-coli in lettuce have been impacted by urea:

$$(NH_2)_2CO+O_3 \rightarrow N_2+CO_2+2H_2O$$

Ozonated fluids produced by the ozonated fluid dispensing system were analyzed. During the production of the ozonated fluid, oxygen is drawn in through an ambient air dryer with the drying capacity to supply sufficient oxygen at a minus dew point to the generating system, the generating system accumulates excess volume of high-quality gas, which is stalled or held in the chambers, thereby supplying a consistent maximum volume of gas resulting in an ample supply of gas to the injecting system, thereby assuring zero cavitation at the point of gas-liquid interface. The pressure differential created by the fluid mixing paths reduces the size of the bubbles to a uniformed size bubbles with a spherical geometry that are entrained in the water, thereby lowering the surface tension of the processed fluid. This process makes the fluid act like a surfactant and reduces the surface tension from 72 Millinewtons per meter at 20° C. to a tested surface tension of 48-58 Millinewtons equal to 140° F. or 60° C. hot water. At liquid-gas interfaces, surface tension results from the greater attraction of liquid molecules to each other due to cohesion than to the molecules in the gas due to adhesion. The net effect is an inward force at its surface that causes the liquid to behave as if its surface were covered with a stretched elastic membrane. Thus, the surface becomes under tension from the imbalanced forces, which is probably where the term "surface tension" came from. Because of the relatively high attraction of water molecules for each other through a web of hydrogen bonds, water has a higher surface tension (72.8 Millinewtons per meter at 20° C.) compared to that of most other liquids. Surface tension is an important factor in the phenomenon of capillary action.

In embodiments, the ozonated fluid dispensing system can be employed within any residential or commercial structure to supply water and ozone solution for cleansing, disinfecting, degreasing, and/or water treatment (e.g., water filtering, disinfecting, and/or softening). For example, the system 300 may be configured to receive water from a water source (e.g., a conventional water main/supply line, or the like) through a water input line, mix the water with ozone, and dispense water and ozone solution through a water output line. The system 300 may be used for a single application or a plurality of different applications. In residential or commercial applications, the system 300 may be configured to supply ozonated water to a water heater or to various taps that receive water from a main water source (e.g., the main water line). In this regard, the system 300 can be employed as a whole home or building water cleansing, disinfecting, degreasing, and/or water treatment solution. Alternatively, the system 300 may be used for a particular zone of a residential or commercial building. In some cases, a plurality of systems can be used to ozonate water in a plurality of zones within a residential or commercial building.

The system 300 can also be used for a variety of applications including, but not limited to: cleansing and/or degreasing hard surfaces such as plastic, glass, ceramic, porcelain, stainless steel, or the like; cleansing and/or degreasing equipment such as food service equipment such as ovens, ranges, fryers, grills, steam cookers, oven stacks, refrigerators, coolers, holding cabinets, cold food tables, worktables, ice machines, faucets, beverage dispensing equipment, beer dispensers, shelving food displays, dish washing equipment, grease traps, or the like; and/or cleansing and/or degreasing HVAC or plumbing systems such as roof top units, air scrubbers, humidifiers, water heaters, pumps, or the like.

Although the invention has been described with reference to embodiments illustrated in the attached drawings, equivalents or substitutions may be employed without departing from the scope of the invention as recited in the claims. Components illustrated and described herein are examples of devices and components that may be used to implement embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A transportable system for generating aqueous ozone solution, comprising:
    a hand truck;
    an ozone supply unit enclosure coupled to the hand truck, the ozone supply unit enclosure including one or more air intake ports and one or more ozone output ports;
    a plurality of ozone generators disposed within the ozone supply unit enclosure, the plurality of ozone generators being fluidically coupled to the one or more air intake ports and the one or more ozone output ports of the ozone supply unit enclosure;
    a primary auxiliary compartment coupled to the hand truck, the primary auxiliary compartment including a mixing assembly comprised of:
        a first flow path for water to flow through, the first flow path including one or more ozone intake ports, the one or more ozone intake ports being fluidically coupled to the one or more ozone output ports of the ozone supply unit enclosure; and
        a second flow path fluidically coupled in parallel with the first flow path, the second flow path including a control valve that selectively permits a portion of the water to flow through the second flow path to produce a negative pressure in the first flow path so that ozone is drawn into the first flow path through the one or more ozone intake ports and mixed into the water flowing through the first flow path to produce an aqueous ozone solution; and
    a secondary auxiliary compartment coupled to the hand truck and fluidically coupled to the one or more ozone output ports of the ozone supply unit enclosure, the secondary auxiliary compartment and including another mixing assembly for producing additional aqueous ozone solution.

2. The transportable system of claim 1, wherein the primary auxiliary compartment has a first flow rate, and the secondary auxiliary compartment has a second flow rate.

3. The transportable system of claim 2, wherein the first flow rate is different from the second flow rate.

4. The transportable system of claim 1, wherein the ozone supply unit enclosure is mounted to a front of the hand truck, and the primary and secondary auxiliary compartments are mounted to a back of the hand truck.

5. The transportable system of claim 1, further comprising:
    a plurality of stop valves for respective mixing assemblies of one or more selected auxiliary compartments from the primary auxiliary compartment and the plurality of secondary auxiliary compartments to an output.

6. The transportable system of claim 5, wherein the plurality of stop valves are further configured to connect the respective mixing assemblies of the primary and secondary auxiliary compartments in parallel with one another.

7. The transportable system of claim 1, wherein the control valve is adjustable to vary the negative pressure produced in the first flow path in order to control an ozone concentration of the aqueous ozone solution.

8. The transportable system of claim 1, wherein the second flow path further includes a flow switch configured to generate a control signal to activate the plurality of ozone generators to generate the ozone in response to sensing the portion of the water flowing through the second flow path.

9. The transportable system of claim 1, further comprising at least one air dryer externally coupled to the ozone supply unit enclosure, the at least one air dryer being configured to remove moisture from air before the air is supplied to the plurality of ozone generators through the one or more air intake ports.

10. The transportable system of claim 1, wherein the plurality of ozone generators includes a first set of ozone generators fluidically connected in series to a first air intake port of the one or more air intake ports and a second set of ozone generators fluidically connected in series to a second air intake port of the one or more air intake ports.

11. The transportable system of claim 10, wherein the first set of ozone generators and the second set of ozone generators are fluidically connected in parallel to an ozone output port of the one or more ozone output ports.

12. The transportable system of claim 1, further comprising a plurality of controllers disposed within the ozone supply unit enclosure, wherein each of the controllers is communicatively coupled to a respective ozone generator of the plurality of ozone generators.

13. The transportable system of claim 1, wherein the ozone supply unit enclosure and the mixing assembly are fluidically coupled by one or more tubes for transferring ozone from the one or more ozone output ports of the ozone supply unit enclosure to the one or more ozone intake ports of the first flow path of the mixing assembly.

14. The transportable system of claim 1, wherein each of the primary and secondary auxiliary compartments includes at least a first opening for a water input port, a second opening for an aqueous ozone solution output port, and a third opening for the one or more ozone intake ports.

15. The transportable system of claim 1, further comprising:
a quick connect port fluidically coupled to a manifold for supplying the water to the primary and secondary auxiliary compartments, the quick connect port being configured to receive the water from a water source via a quick connect adapter.

16. The transportable system of claim 15, wherein the quick connect port includes an annular indentation configured to mate with the quick connect adapter.

17. The transportable system of claim 16, wherein the quick connect adapter includes at least two latches configured to lock into the annular indentation of the quick connect port to secure the quick connect adapter and the quick connect port together.

18. The transportable system of claim 1, further comprising:
an ORP monitor coupled to a shared output line for respective mixing assemblies of the primary and secondary auxiliary compartments.

\* \* \* \* \*